United States Patent
Rabii et al.

(10) Patent No.: US 10,511,948 B2
(45) Date of Patent: *Dec. 17, 2019

(54) INFLIGHT ENTERTAINMENT SYSTEM THAT SELECTS AMONG PASSENGER ELECTRONIC DEVICES FOR CONNECTION BASED ON POWER MEASUREMENTS

(71) Applicant: Thales Avionics, Inc., Irvine, CA (US)

(72) Inventors: Khosro Rabii, San Diego, CA (US); Jean-Yves Couleaud, Mission Viejo, CA (US); Pierre Schuberth, Ojai, CA (US); Pankaj Trivedi, Los Alamitos, CA (US); Thomas Jackson, Laguna Niguel, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,573

(22) Filed: Oct. 22, 2018

(65) Prior Publication Data

US 2019/0098478 A1 Mar. 28, 2019

Related U.S. Application Data

(63) Continuation of application No. 15/718,054, filed on Sep. 28, 2017, now Pat. No. 10,136,293.

(51) Int. Cl.
| | |
|---|---|
| *H04W 4/80* | (2018.01) |
| *G08B 5/22* | (2006.01) |
| *H04W 8/00* | (2009.01) |
| *H04B 17/318* | (2015.01) |
| *H04W 4/02* | (2018.01) |
| *H04W 4/04* | (2009.01) |
| *H04W 76/11* | (2018.01) |
| *H04W 4/40* | (2018.01) |

(52) U.S. Cl.
CPC .............. *H04W 4/80* (2018.02); *G08B 5/221* (2013.01); *H04B 17/318* (2015.01); *H04W 8/005* (2013.01); *H04W 4/023* (2013.01); *H04W 4/046* (2013.01); *H04W 4/40* (2018.02); *H04W 76/11* (2018.02)

(58) Field of Classification Search
CPC ................................ H04W 4/80; H04W 8/005
See application file for complete search history.

(56) References Cited

U.S. PATENT DOCUMENTS

| | | | | |
|---|---|---|---|---|
| 2014/0282727 | A1* | 9/2014 | Keen ................... | H04N 21/4222 725/37 |
| 2015/0150061 | A1* | 5/2015 | Bleacher .............. | H04N 21/422 725/76 |

* cited by examiner

*Primary Examiner* — Tuan H Nguyen

(57) ABSTRACT

An inflight entertainment system for use in an aircraft displays commands to a passenger to move a passenger electronic device (PED) between locations defined relative a seatback display device and the passenger's seat. The system measures received signal strength indications (RSSIs) from discoverable PEDs over time while the PED is moved between the locations, and selects one of the PEDs that satisfies a defined rule for an amount of change that is observed over time in the measured RSSIs for that PED. The system then establishes a connection through a Bluetooth transceiver with a Bluetooth transceiver of the selected PED.

21 Claims, 10 Drawing Sheets

INFLIGHT ENTERTAINMENT SYSTEM THAT SELECTS AMONG PASSENGER ELECTRONIC DEVICES FOR CONNECTION BASED ON POWER MEASUREMENTS

CROSS REFERENCE TO RELATED APPLICATIONS

This application claims priority as a continuation of U.S. patent application Ser. No. 15/718,054 filed on Sep. 28, 2017, the disclosure and content of which is incorporated by reference herein in its entirety.

FIELD OF THE INVENTION

The present disclosure relates to inflight entertainment systems for use in aircraft and, more particularly, to establishing communication connections between seatback display devices and passenger electronic devices.

BACKGROUND

In-flight entertainment (IFE) systems have been deployed onboard aircraft to provide entertainment, such as movies, television, audio entertainment programming, electronic games, and other electronic content to passengers. IFE systems are increasingly using wireless access points to provide the electronic content from a content server to passenger equipment that is carried on-board (e.g., cellular phones, tablet computers, laptop computers), seat video display units (SVDUs), and other communication terminals within the aircraft. Some IFE systems provide wireless controllers, also referred to as passenger control units (PCUs), at passenger seats that are wirelessly connected through Bluetooth to the seats' SVDUs, and which can be held by passengers and operated to control content selection and playback through the SVDUs. IFE systems may also allow passengers to use Bluetooth connectivity to their electronic devices (e.g., wireless headphones, cellular phone terminals, laptops, tablet computers, health monitoring devices, other passenger wearables, etc.) to control SVDUs. The PCUs, electronic devices transported by passengers onto the aircraft, and other Bluetooth electronic devices that can be handheld by passengers during flight and can be connected via Bluetooth to SVDUs and/or other electronic devices of a system, are collectively referred to as Passenger Electronic Devices (PEDs) for convenience.

The proliferation of PEDs operating simultaneously and with unsynchronized use of the unlicensed Industrial, Scientific and Medical (ISM) radio resources within an aircraft cabin, can result in significant difficulty when attempting to select a desired one of the PEDs for connection to a SVDU or another electronic device. Although the SVDU, for example, may display for a passenger a list Bluetooth identifiers of PEDs that have discovered through Bluetooth signaling, the identifiers may provide little help to passenger with identifying which PED from among potentially dozens or hundreds of listed PEDs should be selected for connection to the SVDU. Selecting a wrong PED or a sequence of wrong PEDs can result in failed SVDU operation, present a security risk to the SVDU operation, and/or reduce the quality of service provided by the IFE system to passengers.

SUMMARY

Some embodiments of the present disclosure relate to an inflight entertainment system for use in an aircraft that displays commands to a passenger to move a PED between different locations that are defined relative a SVDU and/or the passenger's seat. The system measures received signal strength indications (RSSIs) from discoverable PEDs over time while the PED is moved between the locations, and selects one of the PEDs that satisfies a defined rule for an amount of change that is observed over time in the sequence of measured RSSIs for that PED. The system then establishes a connection through a Bluetooth transceiver with a Bluetooth transceiver of the selected PED.

One example embodiment of the present disclosure is directed to inflight entertainment system for use in an aircraft. The entertainment system includes a display device, a Bluetooth transceiver, at least one processor connected to the Bluetooth transceiver and the display device, at least one memory connected to the at least one processor. The at least one memory stores program code that is executed by the at least one processor to perform operations.

The operations include displaying a first message on the display device that instructs a passenger to move a PED to a first location, and generating a list of Bluetooth identifiers of PEDs that are discovered through the Bluetooth transceiver. For each of the Bluetooth identifiers in the list, a first RSSI is generated from measurement of at least one radio signal received from the PED having the Bluetooth identifier, and a candidate PEDs data structure is updated to comprise a paired association between the Bluetooth identifier and the first RSSI measured for the at least one radio signal received from the PED having the Bluetooth identifier.

Following the updating of the candidate PEDs data structure, a second message is displayed on the display device instructing the passenger to move the PED to a second location that is spaced apart from the first location. For each of the Bluetooth identifiers in the list that is still discoverable through the Bluetooth transceiver, a second RSSI is generated from measurement of at least one radio signal received from the PED having the Bluetooth identifier, and the candidate PEDs data structure is updated to further associate the Bluetooth identifier to the second RSSI measured for the at least one radio signal received from the Bluetooth device having the Bluetooth identifier.

One of the Bluetooth identifiers is selected that satisfies a defined rule for an amount of change determined between the first and second RSSIs that are associated via the candidate PEDs data structure with the one of the Bluetooth identifiers in the list. Responsive to the selection, a connection is established through the Bluetooth transceiver with a Bluetooth transceiver of the PED having the selected one of the Bluetooth identifiers.

Related vehicle entertainment systems for use in a vehicle, entertainment systems that may be used in non-vehicle applications, and electronic devices are disclosed. Corresponding methods to such apparatuses are also disclosed. It is intended that all such vehicle entertainment systems, entertainment systems, electronic devices, and corresponding methods be included within this description, be within the scope of the present inventive subject matter, and be protected by the accompanying claims. Moreover, it is intended that all embodiments disclosed herein can be implemented separately or combined in any way and/or combination

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
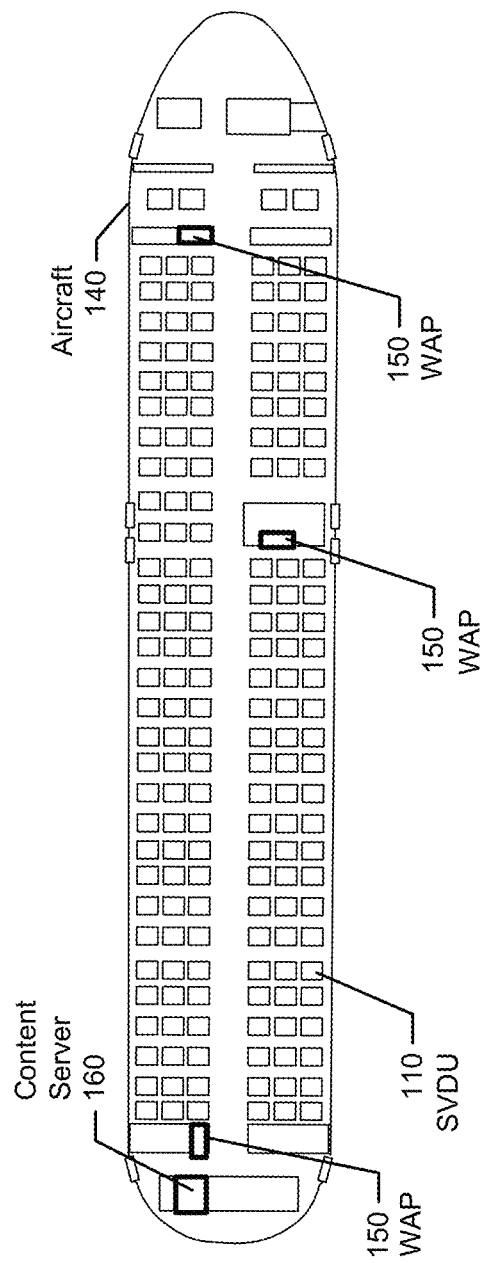
FIG. 1 illustrates an aircraft cabin containing an in-flight entertainment (IFE) system having a content server that streams electronic content through wireless access points (WAPs) to passenger equipment and/or through a wired network to seat video display units (SVDUs) that are controlled by wireless controllers, in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to operating a seat video display unit (SVDU) to more automatically and accurately select a PED from among a group of PEDs that is most likely to be operated by a passenger who is seated in a seat that is expected to operate the SVDU, and to facilitate connection of that PED to the SVDU through a Bluetooth communication link. For example, some embodiments are directed to distinguishing between a PED that is operated by a passenger who is seated in a seat facing a SVDU, from other PEDs handled by passengers in adjacent seats or rows of seats. A SVDU operating according to some embodiments can identify one or more PEDs that are operated by a passenger in the facing seat, and can form a Bluetooth connection(s) with those PED(s) to allow communication therebetween through Bluetooth signaling.

A present realization of this disclosure is that IFE systems for aircraft environments have defined seat configurations with constant distances from where a SVDU is located in a seatback surface to the respective ends of the armrests on opposite sides of a passenger seat, and similarly have a constant distance from the SVDU location to an edge of the passenger seat. These constant distances are used in combination with a defined relationship of the fall off in receive signals strength indicator (RSSI) measured by a Bluetooth transceiver of the SVDU with distance from a transmitting Bluetooth transceiver of a PED, to select a single PED from among a list of PEDs that are detected by the Bluetooth transceiver. The PED is selected based on observing an expected change in RSSI values measured from Bluetooth signaling received from that PED as it is moved between locations that are defined relative to the passenger's seat, the SVDU, and/or locations in space therebetween. As used herein, the term RSSI refers to any measurement of power present in a sensed Bluetooth signal.

These and other embodiments will be explained in further detail below in the non-limiting context of an In-flight entertainment (IFE) system that includes SVDUs which each have a Bluetooth transceiver that is configured to communicate with one or more PEDs. As explained above, PCUs, electronic devices transported by passengers onto the aircraft (e.g., cellular phone terminals, wireless headphones, laptops, tablet computers, health monitoring devices, other passenger wearables, etc.), and other Bluetooth electronic devices that can be handheld by passengers during flight and can be connected via Bluetooth to SVDUs and/or to other components of a system, are collectively referred to as Passenger Electronic Devices (PEDs) for convenience.

Each SVDU can be configured to be mechanically connected to a seat frame within a vehicle, such as within a seat back, an armrest, etc. The Bluetooth transceivers are configured to transmit and receive radio frequency (RF) signals in the ISM band. Although various embodiments herein are primarily described in the context of an IFE system deployed onboard an aircraft, the invention is not limited thereto. Instead, these and other related embodiments may be used to control Bluetooth transceivers located in any type of device and for any type of system application. Various embodiments disclosed herein may be particularly advantageous for deployment in environments where a passenger's attempt to identify a correct PED for Bluetooth connection is complicated by a possibly high density of discovered Bluetooth transceiver equipped PEDs. Accordingly, the systems, devices, and methods herein may be used in other types of vehicles, including without limitation, trains, automobiles, cruise ships, and buses, and in other non-vehicle installations, including without limitation, meeting rooms, sports stadiums, etc.

Embodiments are also described in the non-limited context of the Bluetooth transceivers being configured to transmit and receive using radio resources in the ISM band. As used herein, the term "ISM band" refers to one or more frequency ranges that are reserved internationally for the use of radio frequency energy for unlicensed and/or licensed communications. The term "band" can refer to one continuous frequency range or a plurality of non-continuous frequency ranges that are defined by the ITU Radio Regulations for ISM communications.

FIG. 1 illustrates an aircraft cabin 140 containing an IFE system that provides entertainment services to passengers. The IFE system can include a content server 160 that streams and/or downloads electronic content through wired networks (e.g., Ethernet) and/or through wireless access points (WAPs) 150 to SVDUs 110 that may be mounted to structures within the aircraft, including to seatbacks, seat armrests/frames, bulkheads, overhead structures, etc. The content server 160 may additionally stream and/or download electronic content through WAPs 150 to passenger equipment carried on-board by passengers, such as mobile phones, tablet computers, laptop computers, etc. The SVDUs 110 each contain a Bluetooth transceiver that wirelessly communicates through ISM band RF signaling with Bluetooth transceivers within various types of passenger controllers, which may be releasable docked to an armrest docket station and/or a docket station connected to or adjacent to some/all of the SVDUs 110. The SVDUs 110 may additionally communicate with various types devices that a passenger can bring on board the aircraft, such as wireless headphones and mobile computing devices, such as cellular phones, tablet computers, laptop computers, and other types of PEDs. The Bluetooth transceiver within a SVDU 110 is understood to be the communication circuitry (i.e., transceiver, signal processor, etc.) which can be incorporated within the same housing that at least partially encloses a display device, video display circuitry, network interface, and other circuitry providing functionality for the SVDU 110.

The SVDUs 110 can be connected to request and receive content from a central content server through a backbone network 208, such as 1000 base-T Ethernet. The PEDs can be operated by a passenger to wirelessly control the SVDU 110 through Bluetooth connections, such as to select content that is consumed from the content server (e.g., played through a display device), select among displayed menu items, and control other operations of the SVDU 110, and/or to receive content from the SVDU 110 such as audio streamed to wireless headphones. Each SVDU 100 may be configured to connect to one or more PEDs operated by a passenger who is seated at a seat that is facing the SVDU 100.

Figure 2:
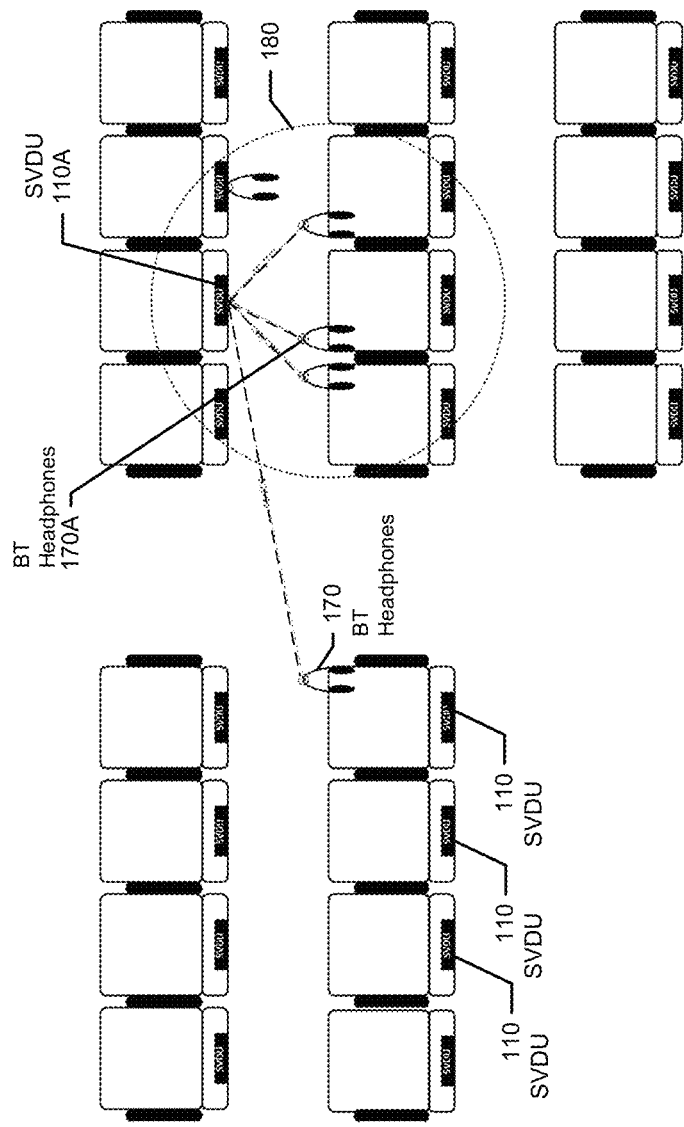
FIG. 2 illustrates rows of seats having SVDUs that provide Bluetooth connectivity to PEDs.

FIG. 2 illustrates rows of passenger seats having SVDUs 110 that provide Bluetooth connectivity to PEDs, which are illustrated as Bluetooth headphones 170. Referring to FIG. 2, a SVDU 110A scans for Bluetooth Inquiry Messages transmitted through the Bluetooth signaling by Bluetooth transceivers of PEDs that are discoverable. In the example of FIG. 2, the SVDU 110A discovers Bluetooth Inquiry Messages transmitted by five different Bluetooth headphones 170, where each of the Bluetooth headphones 170 transmits a unique Bluetooth identifier. The SVDU 110A may display, on a display device, a list of the Bluetooth identifiers of PEDs that are discovered through Bluetooth signaling. However, the identifiers may provide little help to a passenger who is attempting to identify the passenger's held PED, such as Bluetooth headphone or cellular phone.

Moreover, in a full-capacity boarded aircraft environment it can be possible for dozens of PEDs to be discovered. In the example of FIG. 2, a single Bluetooth headphone 170A is operated by a passenger who is sitting in a seat that is directly behind and facing the SVDU 110A. Identifying the Bluetooth headphone 170A from among potentially numerous Bluetooth headphones and other PEDs, could be difficult or not feasible for a passenger to accomplish.

Figure 3:
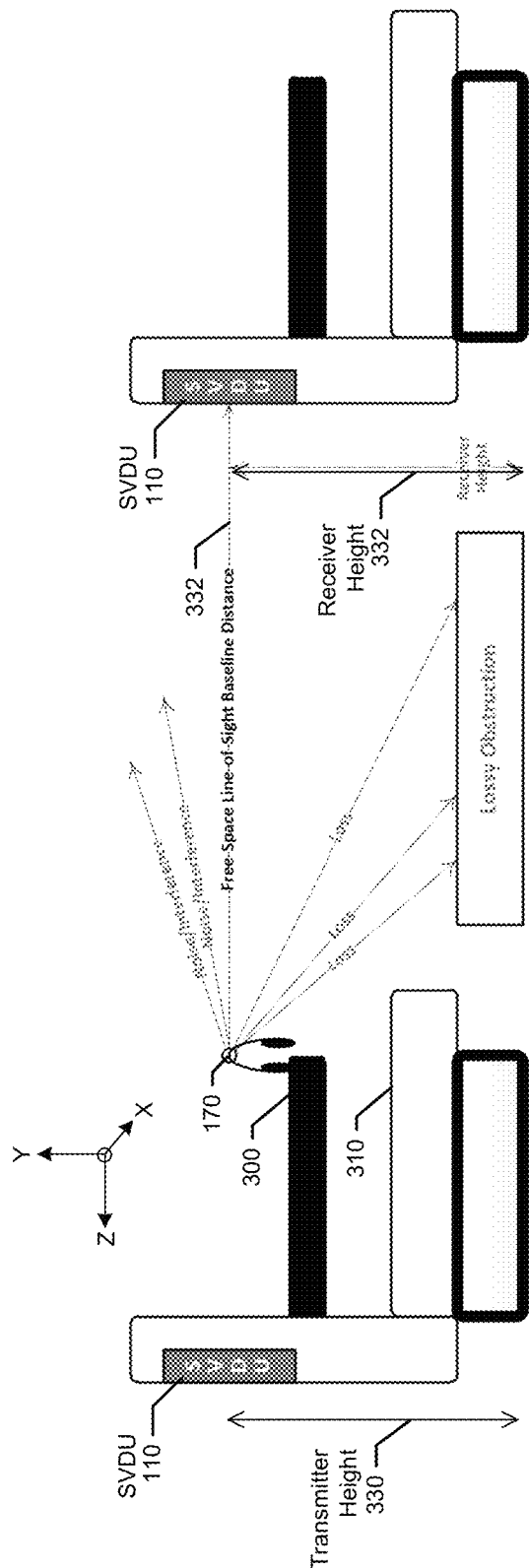
FIG. 3 illustrates a SVDU that selects among discoverable PEDs based on observed changes in RSSI measurement patterns over time, in accordance with some embodiments of the present disclosure.

However, embodiments of the present disclosure operate a SVDU 110 to more automatically and accurately select the Bluetooth headphone 170A for connection with the SVDU 110 through Bluetooth signaling. FIG. 3 illustrates the SVDU 110 that selects among discoverable PEDs based on observed changes in RSSI measurement patterns over time, in accordance with some embodiments of the present disclosure.

Referring to FIG. 3, the SVDU 110 displays messages on a display device that instruct a passenger to move the Bluetooth headphones 172 a plurality of different locations that are defined relative to the passenger's seat, the SVDU 110, and/or locations in space therebetween. For example, the SVDU 110 can display a message instructing a passenger to place the Bluetooth headphones 170 at an end of the armrest 300, then display another message instructing the passenger to place the Bluetooth headphones 170 at an end of the seat 310, and then display another message instructing the passenger to place the Bluetooth headphones 170 at the end of the other armrest of the seat 310, and then display another message instructing the passenger to place headphones 110 against the SVDU 110. In this manner, the SVDU 110 causes the passenger to move the Bluetooth headphones 170 to four different defined locations having constant relative distances to a Bluetooth transceiver antenna of the SVDU 110. In the example of FIG. 3, the Bluetooth headphones 170 transmits Bluetooth signaling from a transmitter height 330 from the cabin floor, which is carried through the air interface along a free-space line-of-site 332 for receipt by a Bluetooth transceiver antenna of the SVDU 110, located at a receiver height 332.

The SVDU 110 operates to generate received signal strength indications (RSSI) from measurement of radio signals received from the Bluetooth headphones 170 while located at each of the defined locations. At each of the locations, the SVDU 110 can update a candidate PEDs data structure to add the Bluetooth identifier and the corresponding RSSI measurement for each of the unique Bluetooth identifiers that are discovered during the measurement process for that location. In the example of FIG. 2, the SVDU 110A would discover five unique Bluetooth identifiers, corresponding to the five different Bluetooth headphones 170, and would perform RSSI measurements for each of those Bluetooth identifiers during each of the time frames when the SVDU 110A is expecting the passenger to have moved the Bluetooth headphones 170A to the next location. The SVDU 110a also updates the candidate PEDs data structure to include the pairs of Bluetooth identifiers and the corresponding RSSI measurements pairs. The candidate PEDs data structure may correspond to an N×M table, where the M columns corresponds to the number of unique Bluetooth identifiers that is discovered at each of the locations that are measured, and the N rows corresponds to the number of locations where RSSI is measured for each of the Bluetooth identifiers. Each of the M column entries are updated to indicate a different one of the Bluetooth identifiers that is discovered, and each of the N row entries is updated to indicate the RSSI measurement for the Bluetooth identifier at the measurement location.

The SVDU 110 is configured to select the Bluetooth headphones 170 from among a list of other Bluetooth PEDs that have been discovered and included in the data structure, using a defined relationship for the how much the RSSI measurements are expected to fall off as a function of distance from the receiving Bluetooth transceiver antenna of the SVDU 110. Moving the Bluetooth headphones 110 between five different fixed locations, enables the SVDU 110 to look for a particular pattern in the amount of change observed in the RSSI measurements as the Bluetooth headphones 110 are moved to each of the sequence of fixed locations. The Bluetooth headphones 110 can be selected from among the other discovered PEDs based on identifying a closest match between the amount of change in the RSSI measurements that are observed and what the SVDU 110 expects to observe based on the known relationship, as explained in further detail below.

Figure 4:
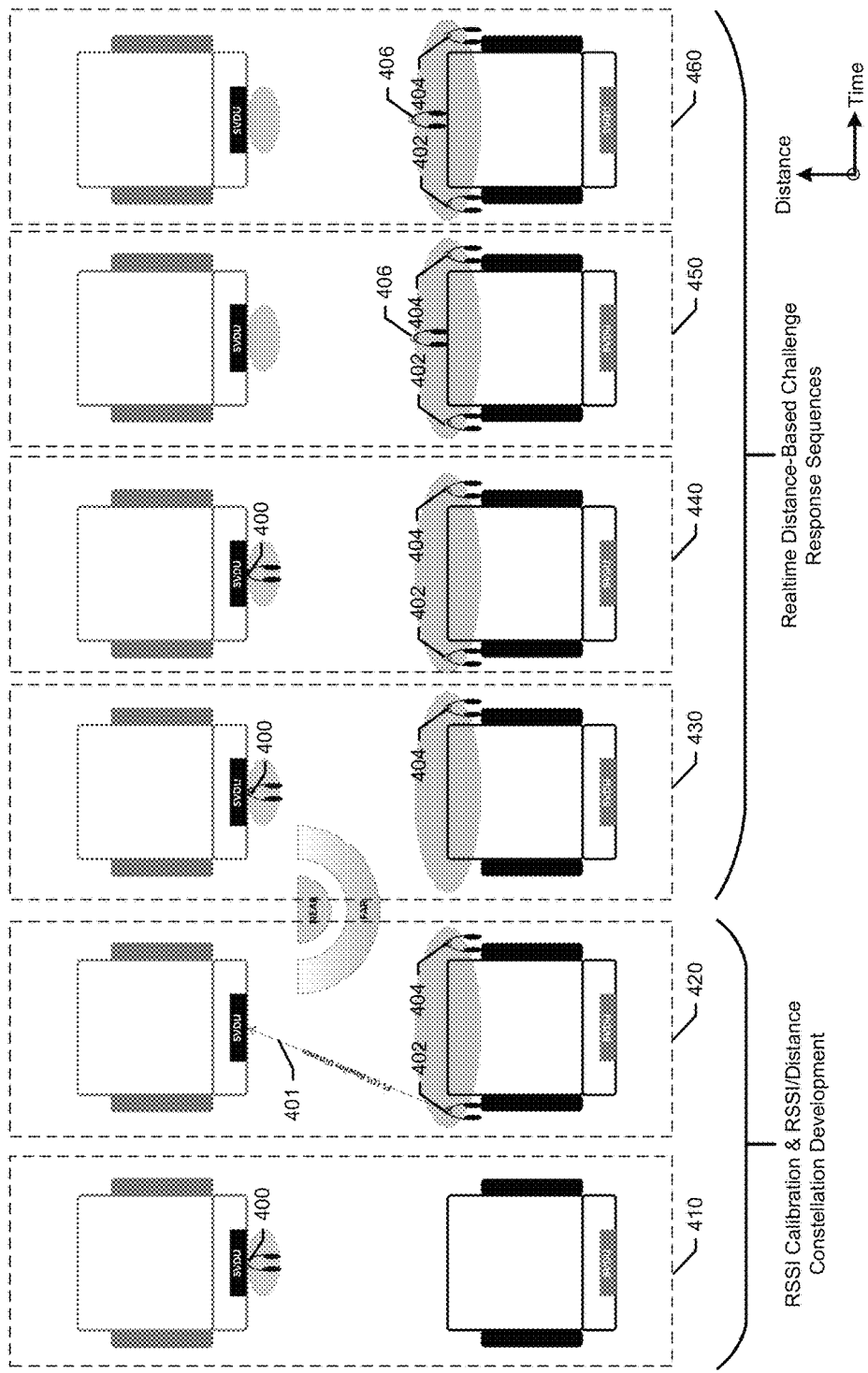
FIG. 4 illustrates sequence of views at different six time instances as a SVDU commands movement of a PED between defined spaced apart locations to cause an expected change in RSSI measurement pattern over the time that is used to select the PED from among discoverable PEDs, in accordance with some embodiments of the present disclosure.

FIG. 4 illustrates sequence of views 410 . . . 460 at different six time instances as a SVDU commands movement of a PED between defined spaced apart locations to cause an expected change in RSSI measurement pattern over the time that is used to select the PED from among discoverable PEDs, in accordance with some embodiments of the present disclosure.

Referring to FIG. 4, time instances 410 and 420 correspond to a RSSI calibration process during which the SVDU determines how much the RSSI changes as the headphone are moved to three different locations 400, 402, and 404. At time instance 410 a crew member is instructed to place the headphone at location 400 against the SVDU. At another time instance 420, the crew member is instructed to move the headphone from location 400 along the path 401 to location 402 at the end of the left armrest, and next instructed to move the headphone to location 404 at the end of the right armrest. The SVDU performs RSSI measurements at each of the three locations, and may further perform measurements while the headphone are moved between the locations, to generate a relationship that defines how much the RSSI changes between those locations. The RSSI measurements and/or a mathematical relationship defining the amount of change therebetween, can be stored as part of the calibration process for future use in identifying a PED that is operated by a passenger who is seated in that passenger seat.

Time instances 430, 440, 450, and 460 correspond to a real time distance-based challenge response sequence of commands that are provided by the SVDU to a passenger to cause the passenger to move a PED, also illustrated as a headphone, between various defined locations while the SVDU performs RSSI measurements of Bluetooth signals received from the PED. In accordance with some embodiments, the SVDU performs RSSI measurements on Bluetooth Inquiry Messages that are received from the PEDs. Limiting the RSSI measurement process to received Bluetooth inquiry messages can be advantageous, because it limits the search space to only Bluetooth identifiers of PEDs that are in a connection establishment mode and, thereby, eliminates Bluetooth identifiers of PEDs that are already connected to another device and not actively seeking a new or additional Bluetooth connection.

The time instances 430, 440, 450, and 460 may be alternative scenarios that can be used to command the passenger to move a PED to various ones of the defined locations. Accordingly, it is not necessary that a single SVDU perform operations of each of those time instances, but instead different SVDU's along a row of seats may be configured to perform different ones of the operations it illustrated in the time instances 430, 440, 450, and 460. For example, in a row of four seats, each of the SVDU's in a different one of the seats can be configured to perform the operations of a different one of the time instances 430, 44, 450, and 460.

Alternatively, SVDUs that are adjacent located or each SVDU along a row may randomly select among the alternative operational sequence scenarios 430-460, or may be configured to use different ones of the operational sequence scenarios 430-460, to reduce interference each other's operation that may otherwise result if adjacent SVDUs were simultaneously operating to command adjacently seated passengers to move PEDs in the same manner. For example, one SVDU could use operational sequence scenario 430 to select a PED, an adjacent SVDU could use operational sequence scenario 440 to select a PED; still another adjacent SVDU could use operational sequence scenario 450 to select a PED; and still another adjacent SVDU could use operational sequence scenario 460 to select a PED.

Referring to time instance 430, the SVDU instructs the passenger to move the headphone from location 400 against the SVDU to location 404 at the end of the right armrest. At time instance 440, the SVDU instructs a passenger to move the headphone between location 400 against the SVDU, location 402 at the end of the left armrest, and location 404 at the end of the right armrest. At time instances 450 and 460, one or more SVDUs instruct a passenger to move the headphone between location 402 at the end of the left armrest, location 404 at the end of the right armrest, and location 406 at the center of the outside seat edge.

Figure 5:
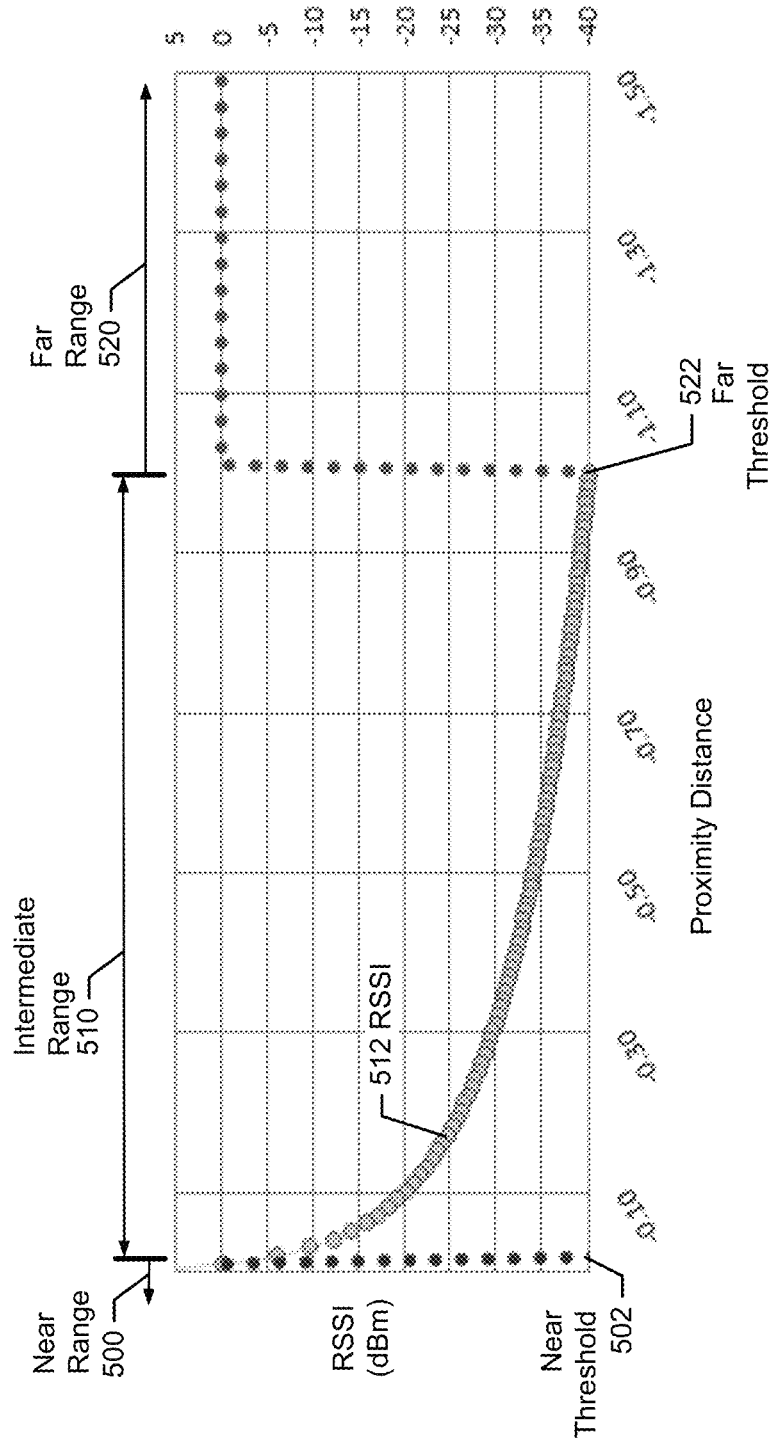
FIG. 5 is graph of RSSI measurements of Bluetooth Inquiry Messages received from a PED as a function of proximity distances from the PED to a Bluetooth transceiver of a SVDU, and further illustrates various thresholds that are used to select the PED in accordance with some embodiments of the present disclosure.

The magnitude of the RSSI measurement values changes with a defined relationship based on changes in the proximity distance between the transmitting and receiving Bluetooth transceivers, and which can be used to select a PED from among discoverable PEDs. FIG. 5 is graph of RSSI measurements of Bluetooth Inquiry Messages received from a PED as a function of proximity distances from the PED (i.e., Bluetooth transmitter antenna) to the SVDU (i.e., Bluetooth receiver antenna), and further illustrates various thresholds that are used to select the PED in accordance with some embodiments of the present disclosure.

Referring to FIG. 5, the horizontal X axis represents the proximity distance from the transmitting PED to the receiving SVDU, and the vertical Y axis represents the RSSI measurement values in dBm. It is observed that the RSSI measurement values 512 rapidly fall off with increasing proximity distance, and can be grouped into three distinct ranges, a near range 500 while the transmitting PED is very close to the receiving SVDU, an intermediate range 510 while the transmitting PED is further away, and a far range 520 when the transmitting PED is still more distant. Two threshold values, a near threshold 502 and a far threshold 522, have been defined, such as through the RSSI calibration operation, to distinguish between when the RSSI measurement indicates that the proximity distance is within the near range 500, within the far range 520, or somewhere within the intermediate range 510.

For example, a RSSI measurement from a PED that is greater than the near threshold 502 is determined to be located within the near range 500. In contrast, another RSSI measurement from the PED that is less than the near threshold 502 but greater than the far threshold 522 is determined to be located within the intermediate range 510. Similarly, another RSSI measurement from the PED that is less than the near threshold 502 and less than the far threshold 522 is determined to be located within the far range 520.

Accordingly, the SVDU can classify the PED's location as being within one of three proximate distance bins, i.e., near range, intermediate range, or far range, for each of the different locations where RSSI measurements are performed, and then match the change between distance bins to the expected changes that should occur as that PED is commanded to move to different locations that are within two or more of different ones of those ranges (e.g., look for a pattern of movement from a location that is near range, then another location that is far range, and then another location that is intermediate range).

Figure 6:
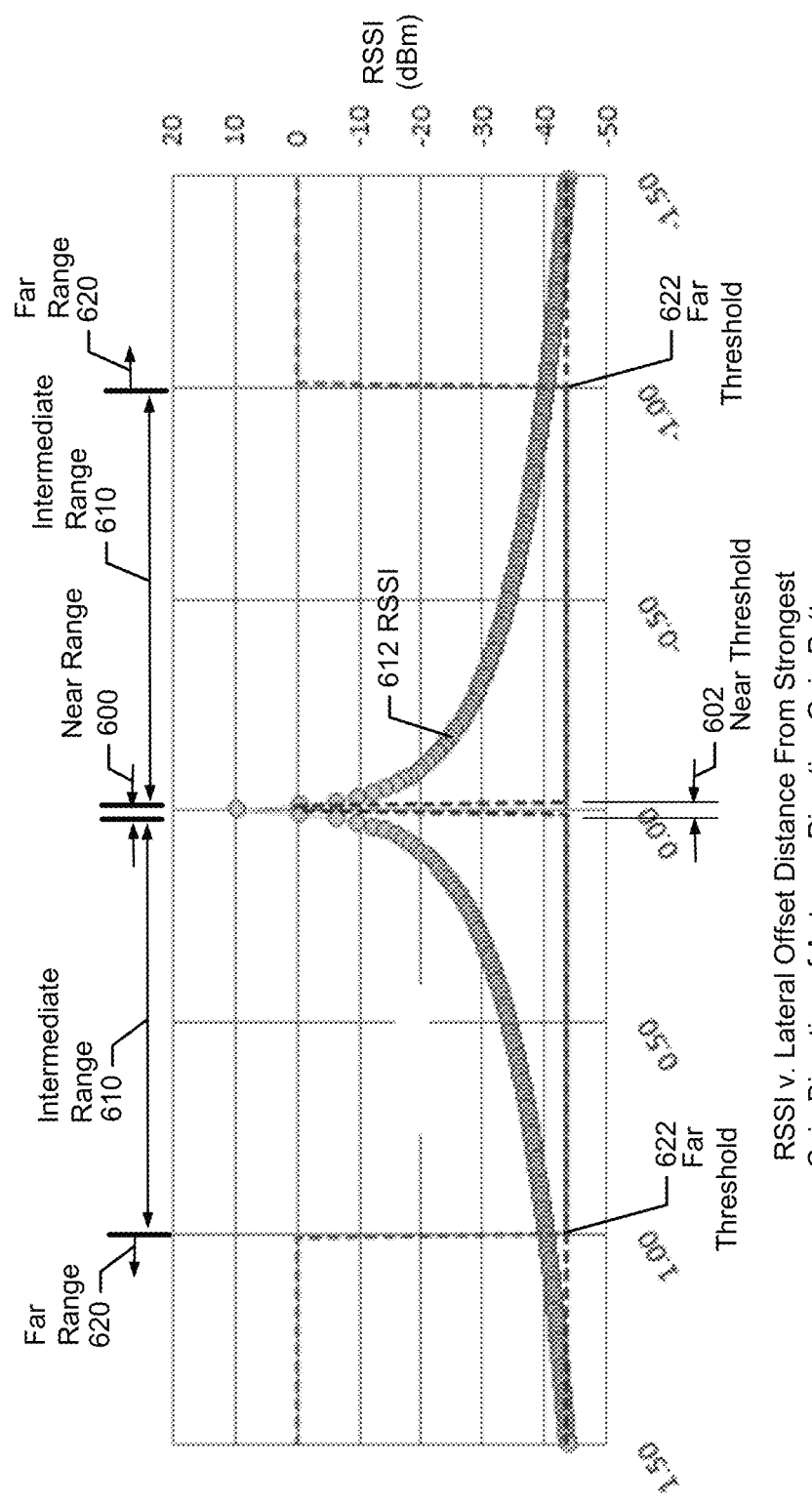
FIG. 6 is graph of RSSI measurements of Bluetooth Inquiry Messages received from a PED as a function of lateral offset distance from a strongest gain direction of an antenna directional gain pattern of a Bluetooth antenna used by a SVDU, and further illustrates various thresholds that are used to select the PED in accordance with some embodiments of the present disclosure.

The Bluetooth antenna that is used by a SVDU may have a directional gain pattern that can be used to select a PED from among discoverable PEDs. FIG. 6 is graph of RSSI measurements of Bluetooth Inquiry Messages received from a PED as a function of lateral offset distance from a strongest gain direction of an antenna directional gain pattern of a Bluetooth antenna used by a SVDU, and further illustrates various thresholds that are used to select the PED in accordance with some embodiments of the present disclosure.

Referring to FIG. 6, the horizontal X axis represents the lateral offset distance from the strongest gain direction of the antenna directional gain pattern of the receiving Bluetooth, and the vertical Y axis represents the RSSI measurement values in dBm. The illustrated graph may correspond to measurements that occur while a PED that is adjacent to a upper right corner of the SVDU housing is then slid across a central location of the housing where the Bluetooth antenna is located and then continue to be slid to an upper left corner of the SVDU housing. It is observed that the RSSI measurement values 612 rapidly rise up to a maximum as the transmitting antenna of the PED becomes aligned with the strongest gain direction of the antenna directional gain pattern of the receiving antenna for the SVDU, and then rapidly falls off with increasing lateral offset distance.

The lateral locations of the PED relative to the SVDU can be similarly grouped into three distinct ranges, a near range 600 while the transmitting PED is very close to being aligned with the strongest gain direction of the antenna directional gain pattern of the receiving intent of the SVDU, an intermediate range 610 while the transmitting PED is further laterally offset from the strongest gain direction of the antenna directional gain pattern, and a far range 620 when the transmitting PED is still further laterally offset. Two threshold values, a near threshold 602 and a far threshold 622, have been defined, such as through the RSSI calibration operation, to distinguish between when the RSSI measurement indicates that the lateral offset distance is within the near range 600, within the far range 620, or somewhere within the intermediate range 610.

For example, a RSSI measurement from a PED that is greater than the near threshold 602 is determined to be located within the near range 600. In contrast, another RSSI measurement from the PED that is less than the near threshold 602 but greater than the far threshold 622 is determined to be located within the intermediate range 610. Similarly, another RSSI measurement from the PED that is less than the near threshold 602 and less than the far threshold 622 is determined to be located within the far range 620.

Accordingly, the SVDU can classify the PED's location as being within one of three lateral distance bins, i.e., near range, intermediate range, or far range, for each of the different locations where RSSI measurements are performed. The SVDU can then match the change between lateral distance bins to the expected changes that should occur as that PED is commanded to move laterally across the face of the SVDU to different locations that are within two or more of different ones of those ranges. For example, when the PED is slid from an upper right corner to an upper left corner of the SVDU housing, and when the receiving Bluetooth antenna for the SVDU is centrally located behind the housing, the SVDU can identify the PED based on observing from the RSSI measurements that the Bluetooth identifier for the PED has a pattern of motion of: 1) far range; 2) intermediate range; 3) near range; 4) intermediate range; and 5) far range.

The operations of FIGS. 5 and 6 can be combined, with the SVDU looking for an expected pattern of proximity distance changes over time between the transmitting PED and receiving SVU and further look for an expected pattern of lateral offset distance changes over time between the transmitting pad and a strongest gain direction of the receiving Bluetooth antenna of the SVDU.

Figure 7:
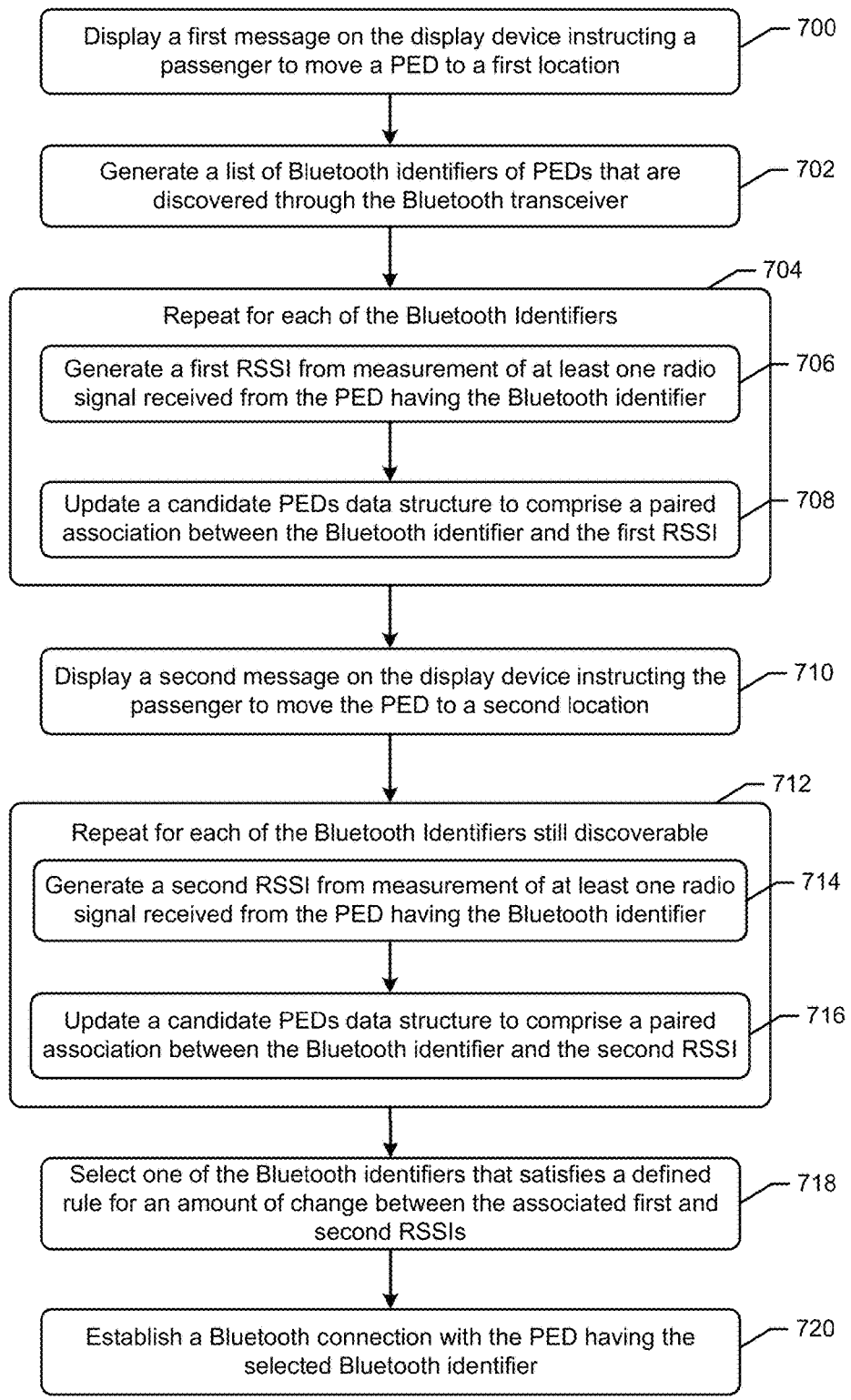
FIG. 7 is a flowchart of operations and methods that can be performed by a processor of a SVDU to select a PED from among discoverable PEDs in accordance with some embodiments of the present disclosure.

FIG. 7 is a flowchart of operations and methods that can be performed by a processor of a SVDU to select a PED from among discoverable PEDs in accordance with some embodiments of the present disclosure.

Referring to FIG. 7, the operations include displaying (block 700) a first message on a display device of the SVDU instructing a passenger to move a PED to a first location. A list is generated (block 702) of Bluetooth identifiers of PEDs that are discovered through the Bluetooth transceiver of the SVDU. The operations repeat (block 704) for each of the Bluetooth identifiers in the list, to generate (block 706) a first RSSI from measurement of at least one radio signal received from the PED having the Bluetooth identifier, and to update (block 708) a candidate PEDs data structure to comprise a paired association between the Bluetooth identifier and the first RSSI measured for the at least one radio signal received from the PED having the Bluetooth identifier.

Following the updating (block 708) of the candidate PEDs data structure, a second message is displayed (block 710) on the display device of the SVDU instructing the passenger to move the PED to a second location that is spaced apart from the first location. The operations repeat (block 712) for each of the Bluetooth identifiers in the list that is still discoverable through the Bluetooth transceiver, to generate (block 714) a second RSSI from measurement of at least one radio signal received from the PED having the Bluetooth identifier, and to update (block 716) the candidate PEDs data structure to further associate the Bluetooth identifier to the second received signal strength indication measured for the at least one radio signal received from the Bluetooth device having the Bluetooth identifier.

One of the Bluetooth identifiers is selected (block 718) that satisfies a defined rule for an amount of change determined between the first and second received signal strength indications that are associated via the candidate PEDs data structure with the one of the Bluetooth identifiers in the list. Responsive to the selection, a connection is established (block 720) through the Bluetooth transceiver with a Bluetooth transceiver of the PED having the selected one of the Bluetooth identifiers.

Establishment of the connection may be performed by displaying the selected Bluetooth identifier by itself for confirmation by the passenger in order to initiate operations to establish the Bluetooth connection. Alternatively, the selected Bluetooth identifier may be more prominently displayed (e.g., displayed at the top of a list of Bluetooth identifiers and/or displayed with a larger font, with an associated graphical indicia to emphasize its presence, etc.) for confirmation by the passenger in order to initiate operations to establish the Bluetooth connection. Still alternatively, the SVDU may automatically initiate operations to establish the Bluetooth connection without precondition of any receipt of further input from the passenger.

The SVDU may operate to generate (blocks 706 and 714) the first and second received signal strength indications from signal strengths measurements of only Bluetooth Inquiry Messages that are received from the PEDs. Limiting the RSSI measurement process to received Bluetooth inquiry messages can be advantageous, because it limits the search space to only Bluetooth identifiers of PEDs that are in a connection establishment mode and, thereby, eliminates Bluetooth identifiers of PEDs that are already connected to another device and not actively seeking a new or additional Bluetooth connection.

In some embodiments, the operations select (block 718) the one of the Bluetooth identifiers based on the amount of change satisfying a defined relationship between a far-range received signal strength and a near-range received signal strength that are expected to be received from the one of the Bluetooth identifiers that is moved between the first and second locations by the passenger responsive to the displayed first and second messages.

Operations by the SVDU can further include a calibration operational mode, during which the SVDU determines a near-range threshold value based on a mathematical combination of measurements of radio signals sequentially received over time from a test PED located at one of the first and second locations, determines a far-range threshold value based on a mathematical combination of measurements of radio signals sequentially received over time from the test PED located at the other one of the first and second locations, and then generates the defined relationship based on the near-range threshold value and the far-range threshold value.

As explained above, the SVDU can operate to display (block 700) the first message displayed on the display device to instruct the passenger to move the PED adjacent to a location defined on one of: 1) a vehicle seat of the passenger; and 2) the display device. The second message that is displayed (block 710) on the display device can instruct the passenger to move the PED adjacent to another location defined on the other one of: 1) the vehicle seat of the passenger; and 2) the display device. These operations have been explained above in the context of, for example, FIGS. 3 and 4.

The operations for selecting (block 718) one of the Bluetooth identifiers that satisfies the defined rule, can include, performing operations for each of at least some of the Bluetooth identifiers in the candidate PEDs data structure, to generate a normalized received signal strength indication based on dividing the second received signal strength indication by the first received signal strength indication, and to determine whether the normalized received signal strength indication satisfies the defined rule. The operation for determining whether the normalized received signal strength indication satisfies the defined rule, may include comparing a threshold value (e.g., the near threshold 502 and the far threshold 522 of FIG. 5 and/or the near threshold 602 and the far threshold 622 of FIG. 6) to the normalized received signal strengths generated for each of the at least some of the Bluetooth identifiers in the candidate PEDs data structure. The operations selecting (block 718) the one of the Bluetooth identifiers from among the at least some of the Bluetooth identifiers in the candidate PEDs data structure, can be based on the one of the Bluetooth identifiers having the closest normalized received signal strength to the threshold value. Thus, for example, the SVDU may select the PED from among candidate PEDs that has the pattern of changes in the measured RSSIs to what is expected to be observed as the PED is moved by a passenger between defined locations.

As explained above, a PED can be selected based on observing the effect of lateral offset distance from a strongest gain direction of an antenna directional gain pattern of a Bluetooth antenna used by a SVDU on the measured RSSI of Bluetooth signaling from the PED. Accordingly, the selecting operations can include selecting (block 718) the one of the Bluetooth identifiers based on the amount of change satisfying a defined relationship between drop-off in received signal strength that is expected to be received from the one of the Bluetooth identifiers that is moved by the passenger from one of the first and second locations that is aligned with a strongest gain direction of an antenna directional gain pattern of a Bluetooth antenna used by the Bluetooth transceiver to another one of the first and second locations that is laterally offset to a side of the strongest gain direction of the antenna directional gain pattern, responsive to the displayed first and second messages.

Operations by the SVDU can further include a calibration operational mode to calibrate the relationship for how much the RSSI values change with lateral offset distance of the transmitting pad from a strongest gain direction of the antenna directional gain pattern of the Bluetooth antenna used by the SVDU. Responsive to initiation of the calibration operational mode, a near-field threshold value is determined based on a mathematical combination of measurements of radio signals sequentially received over time from a test PED located at the one of the first and second locations aligned with the strongest gain direction of the antenna directional gain pattern. A far-field threshold value is determined based on a mathematical combination of measurements of radio signals sequentially received over time from the test PED located at the other one of the first and second locations laterally offset to the side of the strongest gain direction of the antenna directional gain pattern. The defined relationship, which is used during the selection (block 718), is generated based on the near-range threshold value and the far-range threshold value.

For example, the SVDU can display (block 700) the first message on the display device can instruct the passenger to move the PED adjacent to one of: 1) a location that is displayed on the display device or printed on a housing of the display device, that is aligned with the strongest gain direction of the antenna directional gain pattern; and 2) another location that is displayed on the display device or printed on the housing of the display device, that is laterally offset to the side of the strongest gain direction of the antenna directional gain pattern. The second message that is displayed (block 710) on the display device can instruct the passenger to move the PED sideways to be adjacent to the other one of the locations that is displayed on the display device or printed on the housing of the display device. The SVDU can then use the observed changes in the RSSI values as the PED is laterally moved across the antenna gain pattern, to select the Bluetooth identifier of the PED from among other discovered Bluetooth identifiers of other PEDs.

In one embodiment, the SVDU can temporarily increase the directional sensitivity of the antenna to facilitate selection of a PED. For example, during the operations to measure (block 706 and 714) the first and second RSSI from radio signals received from the PEDs, the SVDU can control a variable gain circuit of the receiving Bluetooth antenna to maintain an increased relative difference between gains provided by the position aligned with the strongest gain direction of the antenna directional gain pattern and the other position laterally offset to the side of the strongest gain direction of the antenna directional gain pattern. In contrast, after the connection has been established (block 720) with the PED and remains established, the SVDU can control the variable gain circuit of the Bluetooth antenna to maintain a reduced difference between gains provided by the position aligned with the strongest gain direction of the antenna directional gain pattern and the other position laterally offset to the side of the strongest gain direction of the antenna directional gain pattern. Providing a more omnidirectional antenna directional gain pattern after the connection has been established may advantageously provide a more robust Bluetooth communication channel as the PED is potentially moved through a wide range of spatial positions that are within the arms reach of a passenger who is seated or moving about while holding the SVDU.

As explained above, although various embodiments are described in the context of an in-flight entertainment system, they are not limited thereto. Accordingly, although various operations have been described as being performed by a SVDU, they may instead be performed by other electronic devices and, more particularly, by one or more processors within such electronic devices. Similarly, although various other operations have been described as being performed by a PED, they may instead be performed by other types of electronic devices and, more particularly, by one or more processors within such electronic devices. For example, operations disclosed herein may be used to establish a Bluetooth connection between, without limitation, two cellular phones, between a tablet computer and a Bluetooth headphone, between a display device and a mobile wireless terminal, between a vehicle communication system and a mobile wireless terminal transported by a passenger, etc.

Figure 8:
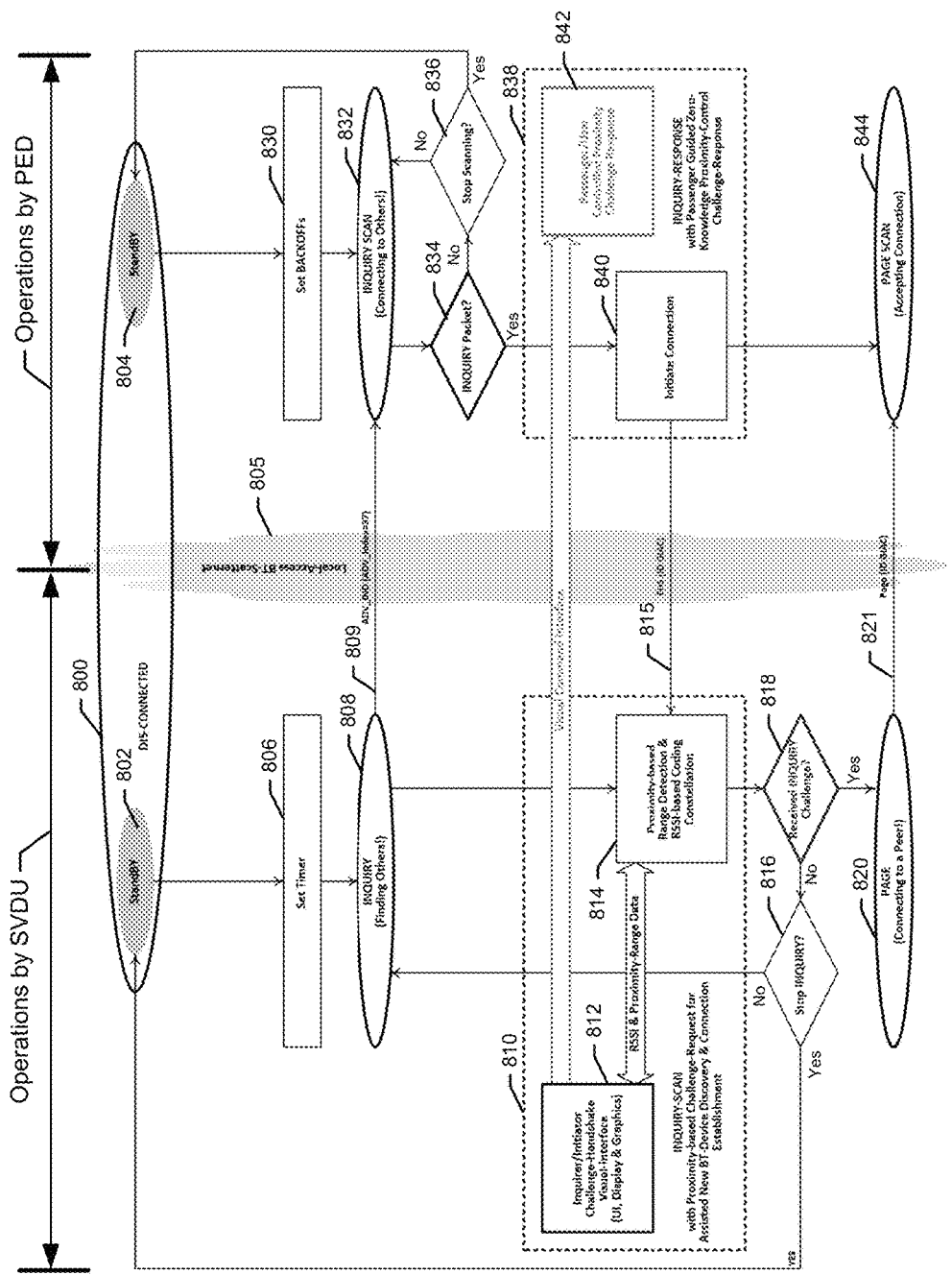
FIG. 8 is a combined dataflow diagram and flowchart of operations and methods by a SVDU and a PED to establish a Bluetooth connection through respective Bluetooth transceivers in accordance with some embodiments of the present disclosure.

FIG. 8 is a combined dataflow diagram and flowchart of operations and methods by a SVDU and a PED to establish a Bluetooth connection through respective Bluetooth transceivers in accordance with some embodiments of the present disclosure.

Referring to FIG. 8, the SVDU is initially in a standby state 802 in which it's Bluetooth transceiver is not connected to a PED. SVDU sets 806 a timer and initiates inquiry operations 808 to discover Bluetooth signaling from PEDs that are within receiver range. The SVDU can transmit advertisements 809 through Bluetooth signaling via a local access Bluetooth scatternet 805, for receipt by PEDs. The SVDU 810 then performs operations 810 to discover and select a PED from among the discovered PEDs, to which a Bluetooth connection is to be established. The SVDU performs proximity-based range detection and RSSI-based coding constellation determination 814 based on Bluetooth Inquiry Messages 815, by a Bluetooth signaling through the local access Bluetooth scatternet 805, that are received from the PEDs. The SVDU performs the Inquirer/initiator challenge-handshake operations 812 explained above FIGS. 4 and 7 to display commands instructing a passenger to move a PED to a plurality of defined locations.

The SVDU selects one of the PEDs based on operations described above, and responsive to the PED continuing to seek a connection (e.g., receiving an inquiry challenge 818) performs operations 820 to connect to the PED, such as by transmitting a connection request 821 to the PED. In contrast, when the PED is not continuing to seek a connection, the SVDU may selectively 816 decide to stop the connection process in return to standby state 802, or return to the discovery operations 808 to generate a new list of PEDs that are seeking connections.

Corresponding operations that can be performed by a PED will now be described with regard to the flowchart shown in FIG. 8 to the right of the local access Bluetooth scatter net 805. The PED is initially in a standby state 804 in which it's Bluetooth transceiver is not connected to a SVDU. The PED sets a backoff timer 830, and performs operations 832 to scan for SVDU Bluetooth advertisements (e.g., perform an inquiry scan for connection to a SVDU). The PED determines 834 whether it has received an inquiry packet among the advertisements received from SVDUs and, if not, it determines 836 whether it should stop scanning and return to the standby state 804 or, instead, repeat operations to scan for receipt 832 of further advertisements.

When an inquiry packet has been received 834 from a SVDU, the PED then performs the corresponding PED operations 838 to support the passenger-user controlled proximity challenge-response operations 842 of FIGS. 4 and 7, and then to initiate 840 a connection to a SVDU, e.g., by transmitting Bluetooth Inquiry Messages for receipt by a SVDU. The PED then performs operations 844 to connect to the SVDU, including by receiving a connection request 821 from the SVDU.

Figure 9:
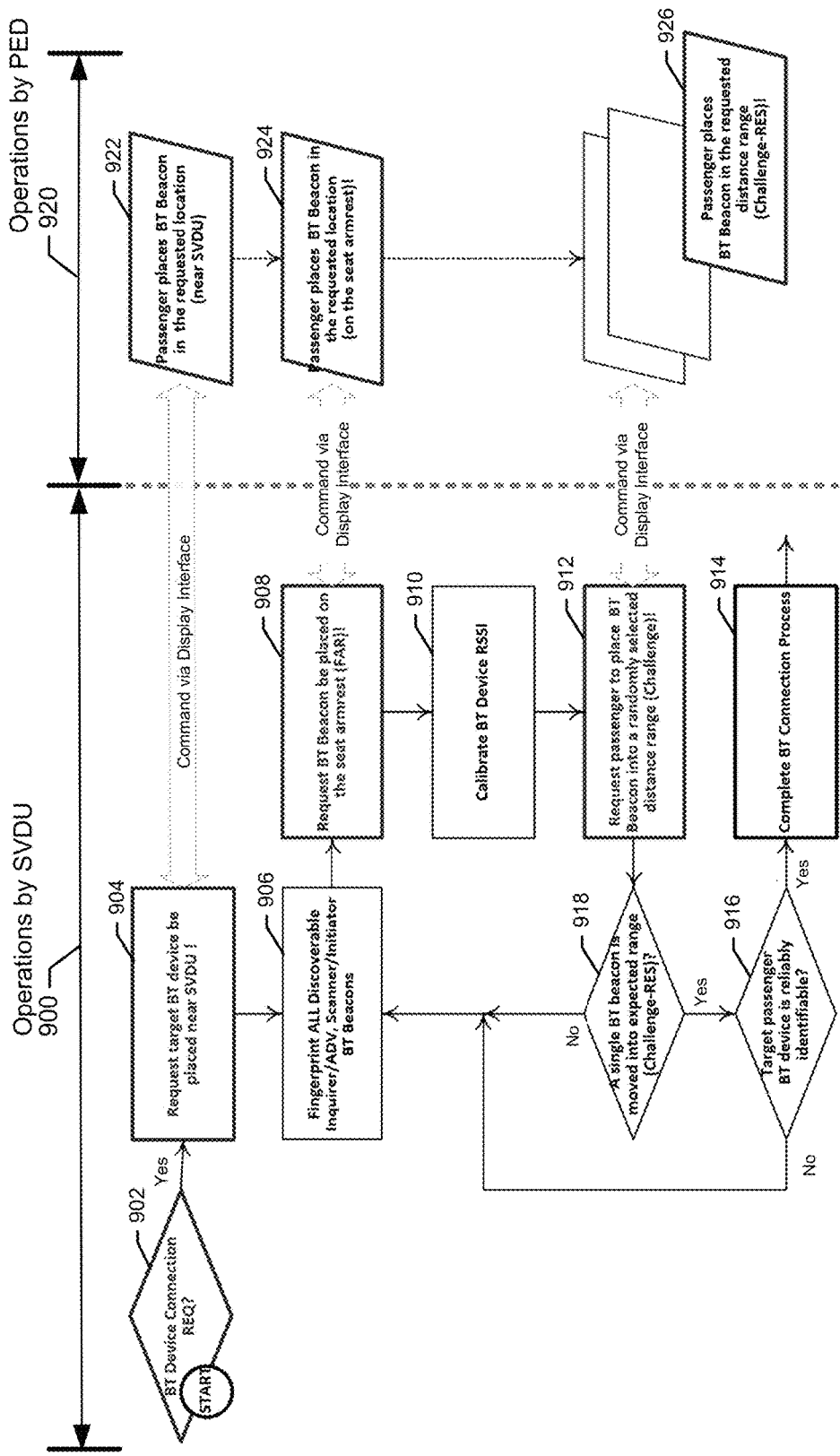
FIG. 9 is a combined dataflow diagram and flowchart of operations and methods by a SVDU and a PED to establish a Bluetooth connection through respective Bluetooth transceivers in accordance with some embodiments of the present disclosure.

FIG. 9 is a combined dataflow diagram and flowchart of operations and methods by a SVDU and a PED to establish a Bluetooth connection through respective Bluetooth transceivers in accordance with some embodiments of the present disclosure.

A determination 902 is made that a Bluetooth device connection request has been received and, responsively, the SVDU requests 904 (e.g., by displaying instructions to the passenger) the target Bluetooth PED (device) be placed near the SVDU to provide a near range RSSI measurement of the PED. The passenger reads the displayed instructions and responsively places 922 the Bluetooth PED at the requested location near the SVDU.

The SVDU generates 906 a "fingerprint" identification for all of the discoverable Bluetooth PEDs, which can include a list of their Bluetooth identifiers and corresponding RSSI measurement values. The SVDU then requests 908 (e.g., by displaying instructions of a passenger) that the Bluetooth had be placed on the seat armrests, so as to provide a far range RSSI measurement of the PED. The passenger reads the displayed instructions and responsively places 924 the Bluetooth PED at the requested location near the seat armrest.

The SVDU can perform operations 910 to calibrate the Bluetooth device RSSI values. The SVDU can then request 912 the passenger to move the Bluetooth PED to one or more defined locations relative to the seat and/or the SVDU so as to form an authentication challenge to identify the PED. The passenger responsively moves 926 the Bluetooth PED to the requested one or more defined locations.

The SVDU determines 918 whether the RSSI values measured for one of the monitored Bluetooth PEDs has a pattern of changes over time that corresponds to what the SVDU expects to observe as the passenger moves the Bluetooth PED to the various defined locations. If a sufficient correspondence is determined 916 to be identified, the SVDU selects the target Bluetooth PED and performs operations 914 to complete establishment of a Bluetooth connection to the target Bluetooth PED.

Example SVDU or Other Bluetooth Electronic Device

Figure 10:
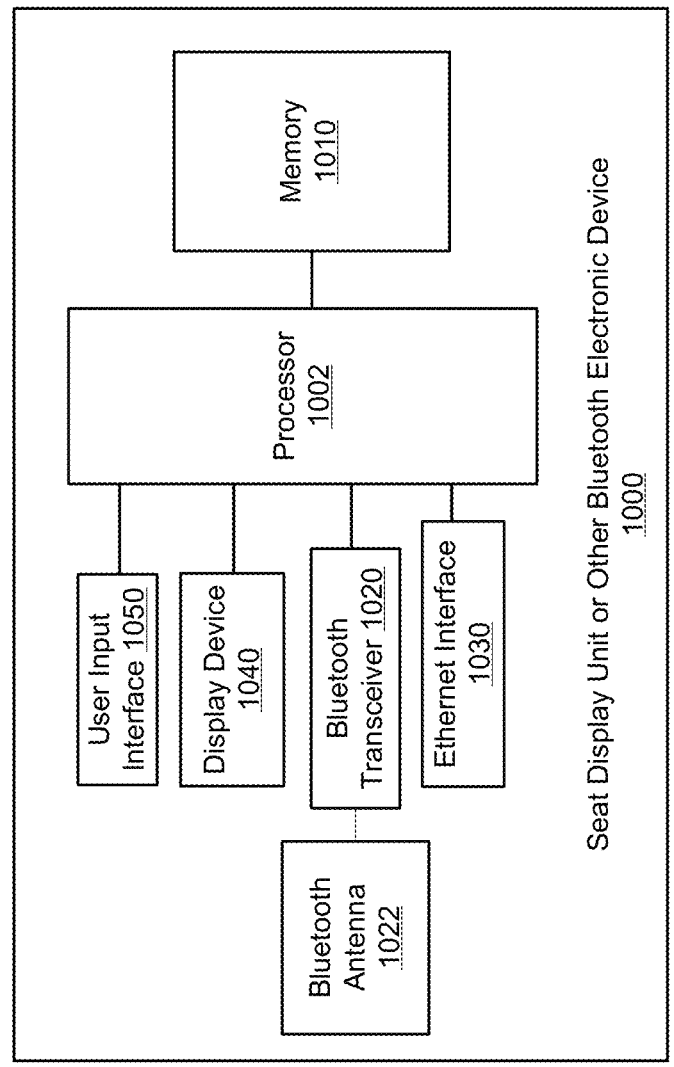
FIG. 10 illustrates a SVDU or other electronic device that is configured to operate according to some embodiments of the present disclosure.

FIG. 10 illustrates a SVDU or other electronic device 1000 that is configured to operate according to some embodiments of the present disclosure. The electronic device 1000 includes at least one processor circuit 1002 (referred to as a processor for brevity), at least one memory circuit 1010 (referred to as a memory for brevity), a Bluetooth transceiver 1020, and a display device 1040 (e.g., graphical display device that may include a touch sensitive display). The electronic device 1000 may further include a user input interface 1050 (e.g., keypad, buttons, touch sensitive interface, etc.) and/or an Ethernet or other wired network interface 1030. The Bluetooth transceiver 1020 transmits and receives through a Bluetooth antenna 1022, which may have a variable gain circuit that can be controlled by the processor to control the antenna directional gain pattern.

The processor 1002 may include one or more data processing circuits, such as a general purpose and/or special purpose processor (e.g., microprocessor and/or digital signal processor) that may be collocated or distributed across one or more networks. The processor 1002 is configured to execute computer program code in the memory 1010, described below as a non-transitory computer readable medium, to perform at least some of the operations described herein as being performed by a SVDU or other Bluetooth electronic device. The computer program code when executed by the processor 1002 causes the processor 1002 to perform operations in accordance with one or more embodiments disclosed herein for the SVDUs or other Bluetooth electronic devices disclosed herein.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A Bluetooth device pairing system comprising:
    a Bluetooth transceiver;
    at least one processor connected to the Bluetooth transceiver and configured to perform operations comprising:
        generating a list of Bluetooth identifiers of persons' electronic devices (PEDs) that are discovered through the Bluetooth transceiver;
        for a plurality of the Bluetooth identifiers in the list,
            generating a first received signal strength indication from measurement of at least one radio signal received from the PED having the Bluetooth identifier, and
            updating a candidate PEDs data structure to comprise a paired association between the Bluetooth identifier and the first received signal strength indication measured for the at least one radio signal received from the PED having the Bluetooth identifier;
        following the updating of the candidate PEDs data structure, communicating a message instructing a person to move the PED to a defined location;
        for a plurality of the Bluetooth identifiers in the list that are still discoverable through the Bluetooth transceiver,
            generating a second received signal strength indication from measurement of at least one radio signal received from the PED having the Bluetooth identifier, and
            updating the candidate PEDs data structure to further associate the Bluetooth identifier to the second received signal strength indication measured for the at least one radio signal received from the Bluetooth device having the Bluetooth identifier;
        selecting one of the Bluetooth identifiers that satisfies a defined rule for an amount of change determined between the first and second received signal strength indications that are associated via the candidate PEDs data structure with the one of the Bluetooth identifiers in the list; and
        responsive to the selection, performing operations for pairing through the Bluetooth transceiver with a Bluetooth transceiver of the PED having the selected one of the Bluetooth identifiers.

2. The Bluetooth device pairing system of claim 1, wherein the operations further comprise:
    generating the first and second received signal strength indications from signal strengths measurements of Bluetooth Inquiry Messages that are received from the PEDs.

3. The Bluetooth device pairing system of claim 1, wherein:
    the one of the Bluetooth identifiers is selected based on the amount of change satisfying a defined relationship between a far-range received signal strength and a near-range received signal strength that are expected to be received from the one of the Bluetooth identifiers that is moved by the person responsive to the message communicated to the person.

4. The Bluetooth device pairing system of claim 3, wherein the operations further comprise:
    responsive to initiation of a calibration operational mode,
        communicating a first message instructing a person to move a person's electronic device (PED) to a first location, wherein the message communicated following the updating of the candidate PEDs data structure is a second message, and wherein the defined location is a second location;
        determining a near-range threshold value based on a mathematical combination of measurements of radio signals sequentially received over time from a test PED located at one of the first and second locations;

determining a far-range threshold value based on a mathematical combination of measurements of radio signals sequentially received over time from the test PED located at the other one of the first and second locations; and generating the defined relationship based on the near-range threshold value and the far-range threshold value.

5. The Bluetooth device pairing system of claim 1, wherein the operation for selecting one of the Bluetooth identifiers that satisfies the defined rule, comprises:

for each of at least some of the Bluetooth identifiers in the candidate PEDs data structure, generating a normalized received signal strength indication based on dividing the second received signal strength indication by the first received signal strength indication; and determining whether the normalized received signal strength indication satisfies the defined rule.

6. The Bluetooth device pairing system of claim 5, wherein the operation for determining whether the normalized received signal strength indication satisfies the defined rule, comprises:

comparing a threshold value to the normalized received signal strengths generated for each of the at least some of the Bluetooth identifiers in the candidate PEDs data structure; and selecting the one of the Bluetooth identifiers from among the at least some of the Bluetooth identifiers in the candidate PEDs data structure, based on the one of the Bluetooth identifiers having the closest normalized received signal strength to the threshold value.

7. The Bluetooth device pairing system of claim 1, wherein:

the one of the Bluetooth identifiers is selected based on the amount of change satisfying a defined relationship between change in received signal strength that is expected to be received from the one of the Bluetooth identifiers that is moved by the person from one of an initial location and the defined location that is aligned with a strongest gain direction of an antenna directional gain pattern of a Bluetooth antenna used by the Bluetooth transceiver to another one of the initial location and the defined location that is laterally offset to a side of the strongest gain direction of the antenna directional gain pattern, responsive to the displayed first and second messages.

8. The Bluetooth device pairing system of claim 7, wherein the operations further comprise:

responsive to initiation of a calibration operational mode, determining a near-field threshold value based on a mathematical combination of measurements of radio signals sequentially received over time from a test PED located at the one of the initial location and the defined location aligned with the strongest gain direction of the antenna directional gain pattern;

determining a far-field threshold value based on a mathematical combination of measurements of radio signals sequentially received over time from the test PED located at the other one of the initial location and the defined location laterally offset to the side of the strongest gain direction of the antenna directional gain pattern; and generating the defined relationship based on the near-range threshold value and the far-range threshold value.

9. The Bluetooth device pairing system of claim 7, further comprising:

communicating a first message instructing a person to move the PED to a first location, wherein the message communicated following the updating of the candidate PEDs data structure is a second message, and wherein the defined location is a second location, wherein:

the first message is displayed on a display device and instructs the person to move the PED adjacent to one of: 1) a location that is displayed on the display device or printed on a housing of the display device, that is aligned with the strongest gain direction of the antenna directional gain pattern; and 2) another location that is displayed on the display device or printed on the housing of the display device, that is laterally offset to the side of the strongest gain direction of the antenna directional gain pattern; and the second message displayed on the display device instructs the person to move the PED sideways to be adjacent to the other one of the locations that is displayed on the display device or printed on the housing of the display device.

10. A Bluetooth device pairing system comprising:

a display device;

a Bluetooth transceiver;

at least one processor connected to the Bluetooth transceiver and the display device, and configured to perform operations comprising:

displaying a first message on the display device instructing a user to move an electronic device (ED) to a first location;

generating a list of Bluetooth identifiers of EDs that are discovered through the Bluetooth transceiver;

for a plurality of the Bluetooth identifiers in the list, generating a first received signal strength indication from measurement of at least one radio signal received from the ED having the Bluetooth identifier, and updating a candidate EDs data structure to comprise a paired association between the Bluetooth identifier and the first received signal strength indication measured for the at least one radio signal received from the ED having the Bluetooth identifier;

following the updating of the candidate EDs data structure, displaying a second message on the display device instructing the user to move the ED to a second location that is spaced apart from the first location;

for a plurality of the Bluetooth identifiers in the list that are still discoverable through the Bluetooth transceiver, generating a second received signal strength indication from measurement of at least one radio signal received from the ED having the Bluetooth identifier, and updating the candidate EDs data structure to further associate the Bluetooth identifier to the second received signal strength indication measured for the at least one radio signal received from the Bluetooth device having the Bluetooth identifier;

selecting one of the Bluetooth identifiers that satisfies a defined rule for an amount of change determined between the first and second received signal strength indications that are associated via the candidate EDs data structure with the one of the Bluetooth identifiers in the list; and responsive to the selection, establishing a connection through the Bluetooth transceiver with a Bluetooth transceiver of the ED having the selected one of the Bluetooth identifiers.

11. The Bluetooth device pairing system of claim 10, wherein:
the one of the Bluetooth identifiers is selected based on the amount of change satisfying a defined relationship between a far-range received signal strength and a near-range received signal strength that are expected to be received from the one of the Bluetooth identifiers that is moved between the first and second locations by the user responsive to the displayed first and second messages.

12. The Bluetooth device pairing system of claim 10, wherein the operation for selecting one of the Bluetooth identifiers that satisfies the defined rule, comprises:
for each of at least some of the Bluetooth identifiers in the candidate EDs data structure,
generating a normalized received signal strength indication based on dividing the second received signal strength indication by the first received signal strength indication; and
determining whether the normalized received signal strength indication satisfies the defined rule.

13. The Bluetooth device pairing system of claim 10, wherein:
the one of the Bluetooth identifiers is selected based on the amount of change satisfying a defined relationship between drop-off in received signal strength that is expected to be received from the one of the Bluetooth identifiers that is moved by the user from one of the first and second locations that is aligned with a strongest gain direction of an antenna directional gain pattern of a Bluetooth antenna used by the Bluetooth transceiver to another one of the first and second locations that is laterally offset to a side of the strongest gain direction of the antenna directional gain pattern, responsive to the displayed first and second messages.

14. The Bluetooth device pairing system of claim 10, wherein the operations further comprise:
responsive to initiation of a calibration operational mode,
determining a near-field threshold value based on a mathematical combination of measurements of radio signals sequentially received over time from a test ED located at the one of the first and second locations aligned with the strongest gain direction of the antenna directional gain pattern;
determining a far-field threshold value based on a mathematical combination of measurements of radio signals sequentially received over time from the test ED located at the other one of the first and second locations laterally offset to the side of the strongest gain direction of the antenna directional gain pattern; and
generating the defined relationship based on the near-range threshold value and the far-range threshold value.

15. An electronic device comprising:
a Bluetooth transceiver;
at least one processor connected to the Bluetooth transceiver and configured to perform operations comprising:
responsive to detecting occurrence of a first operational event,
generating a list of Bluetooth identifiers of other electronic devices (EDs) that are discovered through the Bluetooth transceiver,
for a plurality of the Bluetooth identifiers in the list,
generating a first received signal strength indication from measurement of at least one radio signal received from the ED having the Bluetooth identifier, and
updating a candidate EDs data structure to comprise a paired association between the Bluetooth identifier and the first received signal strength indication measured for the at least one radio signal received from the ED having the Bluetooth identifier;
following the updating of the candidate EDs data structure and responsive to detecting occurrence of a second operational event;
for a plurality of the Bluetooth identifiers in the list that is still discoverable through the Bluetooth transceiver,
generating a second received signal strength indication from measurement of at least one radio signal received from the ED having the Bluetooth identifier, and
updating the candidate EDs data structure to further associate the Bluetooth identifier to the second received signal strength indication measured for the at least one radio signal received from the Bluetooth device having the Bluetooth identifier;
selecting one of the Bluetooth identifiers that satisfies a defined rule for an amount of change determined between the first and second received signal strength indications that are associated via the candidate EDs data structure with the one of the Bluetooth identifiers in the list; and
responsive to the selection, initiating further operations for establishing a connection through the Bluetooth transceiver with a Bluetooth transceiver of the ED having the selected one of the Bluetooth identifiers.

16. The electronic device of claim 15, wherein:
the one of the Bluetooth identifiers is selected based on the amount of change satisfying a defined relationship between a far-range received signal strength and a near-range received signal strength that are expected to be received from the one of the Bluetooth identifiers that is moved between spaced apart first and second locations by a user.

17. The electronic device of claim 15, wherein the operation for selecting one of the Bluetooth identifiers that satisfies the defined rule, comprises:
for each of at least some of the Bluetooth identifiers in the candidate EDs data structure,
generating a normalized received signal strength indication based on dividing the second received signal strength indication by the first received signal strength indication; and
determining whether the normalized received signal strength indication satisfies the defined rule.

18. The electronic device of claim 15, wherein:
the one of the Bluetooth identifiers is selected based on the amount of change satisfying a defined relationship between drop-off in received signal strength that is expected to be received from the one of the Bluetooth identifiers that is moved from a location that is aligned with a strongest gain direction of an antenna directional gain pattern of a Bluetooth antenna used by the Bluetooth transceiver to another spaced apart location that is laterally offset to a side of the strongest gain direction of the antenna directional gain pattern.

19. The electronic device of claim 15, wherein the operations further comprise:
responsive to initiation of a calibration operational mode,
  determining a near-field threshold value based on a mathematical combination of measurements of radio signals sequentially received over time from a test ED located at a location that is aligned with the strongest gain direction of the antenna directional gain pattern;
  determining a far-field threshold value based on a mathematical combination of measurements of radio signals sequentially received over time from the test ED located at another spaced apart location that is laterally offset to the side of the strongest gain direction of the antenna directional gain pattern; and
  generating the defined relationship based on the near-range threshold value and the far-range threshold value.

20. An electronic device (ED) comprising:
a Bluetooth transceiver;
at least one processor connected to the Bluetooth transceiver and configured to perform operations comprising:
responsive to detecting occurrence of a first operational event,
  generating a list of Bluetooth identifiers of other EDs that are discovered through the Bluetooth transceiver,
  for a plurality of the Bluetooth identifiers in the list, generating a first received signal strength indication from measurement of at least one radio signal received from the ED having the Bluetooth identifier;
responsive to detecting occurrence of a second operational event, selecting one of a plurality of Bluetooth identifiers that is presently discoverable and satisfies a defined rule for an amount of change determined between the first received signal strength indication and a presently measured received signal strength indication for the selected one of the Bluetooth identifiers; and
responsive to the selection, initiating further operations for establishing a connection through the Bluetooth transceiver with a Bluetooth transceiver of the ED having the selected one of the Bluetooth identifiers.

21. The electronic device of claim 20, wherein:
the one of the Bluetooth identifiers is selected based on the amount of change satisfying a defined relationship between a far-range received signal strength and a near-range received signal strength that are expected to be received from the one of the Bluetooth identifiers that is moved between spaced apart first and second locations by a user.

* * * * *